United States Patent
Buffetaud et al.

(10) Patent No.: US 10,787,042 B2
(45) Date of Patent: Sep. 29, 2020

(54) DEVICE FOR PROTECTING A TIRE WALL

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Benoit Buffetaud, Clermont-Ferrand (FR); Gilles Godeau, Clermont-Ferrand (FR); Laurence Lapra, Clermont-Ferrand (FR); Mathieu Vandaele, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 489 days.

(21) Appl. No.: 15/516,410

(22) PCT Filed: Oct. 16, 2015

(86) PCT No.: PCT/EP2015/073971
§ 371 (c)(1),
(2) Date: Apr. 2, 2017

(87) PCT Pub. No.: WO2016/062623
PCT Pub. Date: Apr. 28, 2016

(65) Prior Publication Data
US 2018/0229557 A1 Aug. 16, 2018

(30) Foreign Application Priority Data
Oct. 21, 2014 (FR) ..................... 14 60119

(51) Int. Cl.
B60C 13/00 (2006.01)
B60C 13/02 (2006.01)
B60C 19/12 (2006.01)

(52) U.S. Cl.
CPC ............ B60C 13/002 (2013.01); B60C 13/02 (2013.01); B60C 19/12 (2013.01); *B60C 2200/06* (2013.01)

(58) Field of Classification Search
CPC ...... B60C 13/002; B60C 13/02; B60C 13/001
See application file for complete search history.

(56) References Cited

U.S. PATENT DOCUMENTS 4,545,415 A * 10/1985 Lindner .................. B60C 11/11
152/209.1
4,609,022 A * 9/1986 Fetty .................. B60C 11/0306
152/209.1

(Continued)

FOREIGN PATENT DOCUMENTS

EP 2551128 A1 1/2013
JP 08099508 A * 4/1996

(Continued)

OTHER PUBLICATIONS

Machine Translation: JP-2006256432-A; Tamura, Shoji; (Year: 2019).*

(Continued)

*Primary Examiner* — Kendra Ly
(74) *Attorney, Agent, or Firm* — Dickinson Wright PLLC; Steven Hurles

(57) ABSTRACT

The tire comprises a carcass reinforcement which extends into sidewalls. The tire is also provided with a protection device that protects against external attack. The protection device comprises a plurality of raised elements of height H that are arranged in the circumferential direction. The tire is also constructed such that each raised element is formed of at least two parts which are at least partially disjointed from (Continued)

one another along a separation zone. The separation zone is oriented substantially in the circumferential direction. Each part is able to come into contact with another part of the same raised element when one of the parts comes into contact with an external obstacle.

16 Claims, 2 Drawing Sheets

(56) References Cited

U.S. PATENT DOCUMENTS

| | | | | |
|---|---|---|---|---|
| 5,263,525 A * | 11/1993 | Yamashita | ............ | B60C 13/04 |
| | | | | 152/523 |
| 6,530,405 B1 * | 3/2003 | Brown | ................ | B60C 11/01 |
| | | | | 152/209.16 |
| 2004/0187993 A1 * | 9/2004 | Lagnier | ............ | B29D 30/0606 |
| | | | | 152/209.18 |
| 2008/0029193 A1 * | 2/2008 | Perrin | .................... | B60C 11/12 |
| | | | | 152/209.18 |
| 2013/0075006 A1 | 3/2013 | Kojima et al. | | |

FOREIGN PATENT DOCUMENTS

| | | | |
|---|---|---|---|
| JP | 2003011620 A | * | 1/2003 |
| JP | 2004291937 A | | 10/2004 |
| JP | 2006256432 A | * | 9/2006 |

OTHER PUBLICATIONS

Machine Translation: JP-2003011620-A; Matsuyama, Takehiko (Year: 2020).*

Machine Translation: JP-08099508-A; Takeuchi, Tatsuo; (Year: 2020).*

* cited by examiner

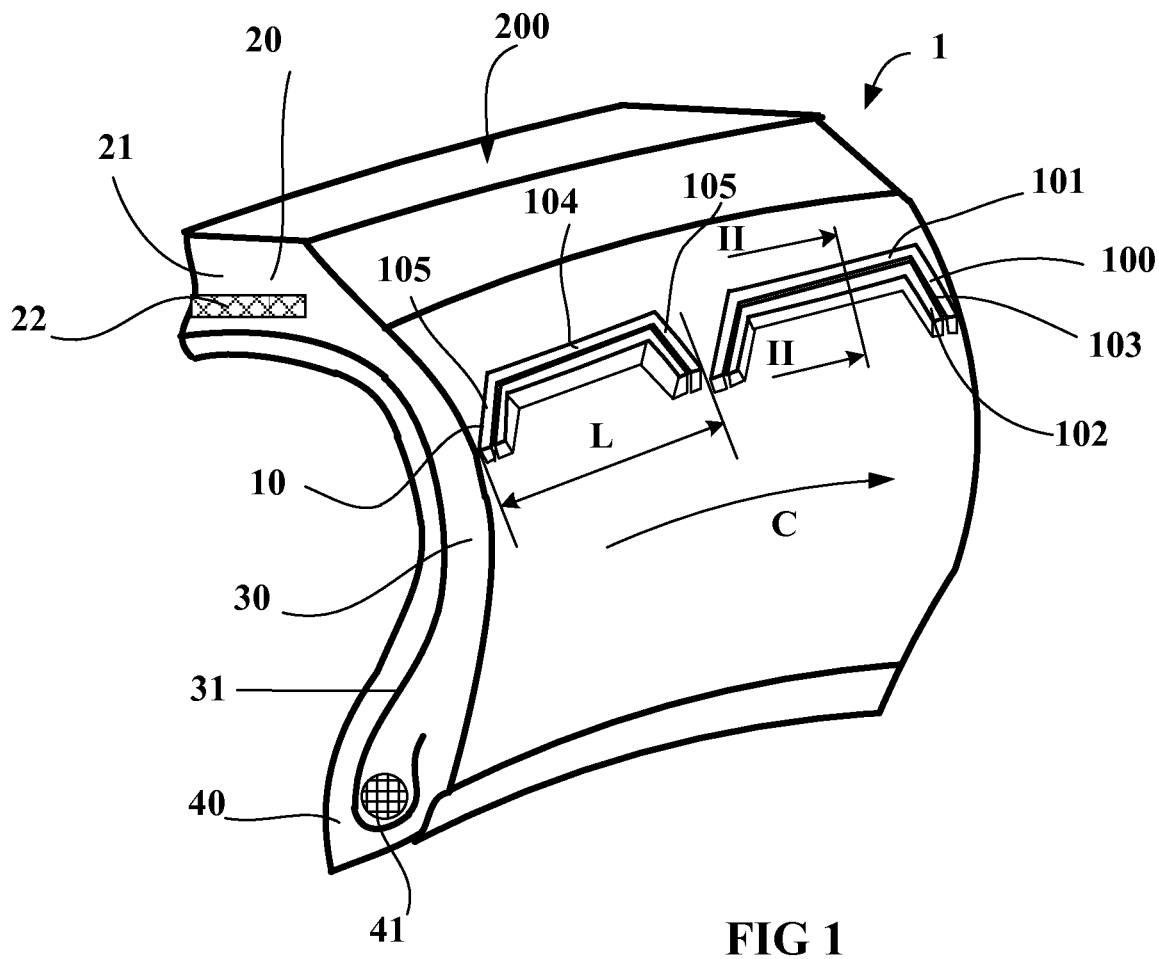
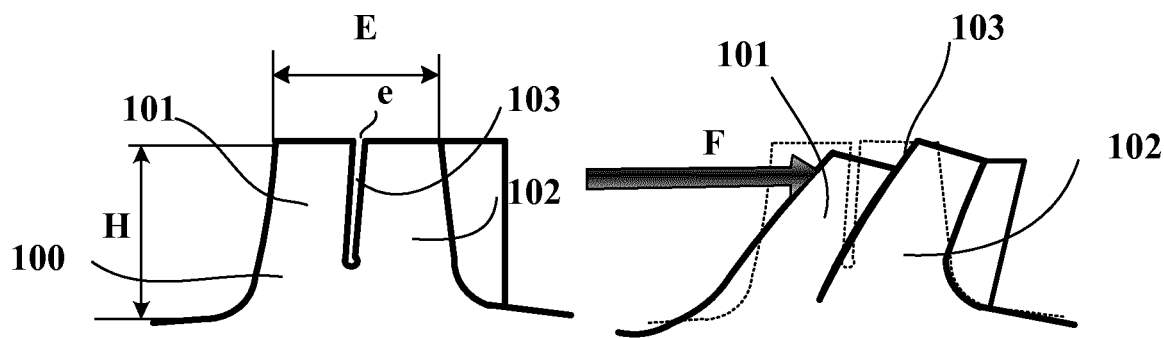
FIG 1
FIG 2
FIG 3

DEVICE FOR PROTECTING A TIRE WALL

CROSS-REFERENCE TO RELATED APPLICATION

The present invention claims priority to PCT International Patent Application Serial No. PCT/EP2015/073971 filed Oct. 16, 2015 entitled "Device For Protecting A Tire Wall," which claims the benefit of FR Patent Application Serial No. 1460119 filed Oct. 21, 2014, the entire disclosures of the applications being considered part of the disclosure of this application and hereby incorporated by reference.

BACKGROUND OF THE INVENTION

1. Field of the Invention

The present invention relates to tires of vehicles that are heavily loaded such as the tires intended to be fitted to heavy duty vehicles. It relates more particularly to a device for protecting these tires against potential attacks suffered by the sidewalls of these tires.

2. Related Art

A tire for a heavy duty vehicle comprises beads intended to come into contact with a mounting rim, sidewalls and a crown. The crown of the tire comprises a reinforcing reinforcement surmounted radially on the outside by a tread of which a surface—referred to as the tread surface—is intended to come into contact with a roadway or ground when the vehicle is running. Each sidewall provides the connection between the crown and one of the beads.

It is known that tires for heavy duty vehicles, notably those used on poor-quality road networks, may experience attack when running or maneuvering. These same tires may also, when running in town, come into contact with kerbs which under certain conditions can be harmful and damage one of the sidewalls. These attacks are caused by obstacles indenting one of the sidewalls of a tire. These attacks may have the consequence of violently stress-loading the carcass and crown reinforcements or may even go so far as to cause the rubber material present between the cords of the carcass reinforcement to break, with all the resulting consequences that may be imagined, notably loss of tire pressure.

These same attacks, without causing breakages at the moment of contact, may affect the ability of the tire to withstand repeated bending loadings; that is because of the high deformations suffered by the materials at the moment of contact with an obstacle.

When running on roads comprising obstacles or various objects, it may happen that the sidewalls are subjected to external attack from these obstacles or these objects. While the majority of such attacks have little influence on the integrity of the sidewalls, breaks may however appear in the loaded sidewall. That is of course highly prejudicial to tire lifetime because the sidewalls often cannot be repaired, the breakages spreading between the cords of the carcass reinforcement reinforcing the sidewalls.

This problem is known and solutions have already been proposed, but it would seem that none of the known solutions is fully satisfactory.

Particularly known is application WO2009/029088 which describes a tire for all-terrain use, this tire being provided with protective blocks on its sidewalls. These protective blocks have inclined surfaces which prevent any snagging on external objects. The blocks are arranged in at least two circles concentric with the axis of rotation so that they are positioned in alternation with one another but without mutual contact.

Particularly known is application US2013/0092308-A1 which describes a tire the sidewalls of which are provided with a plurality of raised patterns on the sidewalls, these patterns having a solid shape and being placed on two circumferential lines next to one another on each line with enough spacing that each pattern on one line is partially interposed between two patterns on the other line and can deform freely.

Application US 2013/075006 A1 describes a tire comprising reliefs intended to increase the turbulence in the flow of air around the tire during running in order to reduce rolling resistance.

Definitions:

Equatorial midplane: this is a plane perpendicular to the axis of rotation and passing through those points of the tire that are radially furthest away from the said axis.

Radial direction is to be understood in this document to mean any direction which is perpendicular to the axis of rotation of the tire.

Transverse or axial direction means a direction parallel to the axis of rotation of the tire.

Circumferential direction means a direction tangential to any circle centered on the axis of rotation. This direction is perpendicular both to the axial direction and to a radial direction.

SUMMARY OF THE INVENTION AND ADVANTAGES

The present disclosure seeks to provide a tire of which at least one sidewall is protected from the external attack suffered by one of the sidewalls of the tire upon contact with an obstacle when this tire is running. This contact may manifest itself in a violent load having a component directed in a direction pointing toward the inside of the internal cavity of the tire and another component directed in a circumferential direction.

To this end, one subject of the disclosure is a tire for a vehicle intended to carry heavy loads, this tire comprising a carcass reinforcement having reinforcers, this tire comprising a crown part comprising a tread intended to be in contact with a roadway during running, this crown part comprising a crown reinforcement extended on each side by sidewalls, these sidewalls themselves being extended by beads intended to come into contact with a mounting rim, this tire being provided with a protection device protecting at least one sidewall against external attack, this protection device comprising a plurality of raised elements formed on the sidewall that is to be protected, this plurality of raised elements of height H being arranged in the circumferential direction. This tire is such that each raised element comprises an intermediate region of elongate shape in the circumferential direction and this intermediate region comprising two ends and is extended, at each of its two ends, by an extension that makes a non-zero angle with the elongate intermediate region of the raised element. Furthermore, each raised element is formed by at least two facing parts, these facing parts are at least partially disjointed from one another along a separation zone, this separation zone being oriented substantially in the circumferential direction, and extending at least partially into each extension. Furthermore, each facing part is able to come into contact with the other part of the same raised element so as to at least partially close the separation zone that exists between the said two facing parts so as to generate friction by the sliding of one part against the other when one of the said parts comes into contact with an external obstacle, with a view to reducing the risk of tears in the sidewall.

According to one advantageous alternative form, each extension of a raised element of the device makes an angle at least equal to 40° with the circumferential direction.

For preference, the parts of the raised elements of the protection device which are intended to come in contact with one another are connected to one another securely by the presence of a bridge of material.

For preference, with each part of raised element of the protection device having a height and a circumferential length, the separation zone separating two parts of one and the same raised element is at least equal to 50% of the surface area of each part, the latter surface area being equal to the product of its height and its length measured in the circumferential direction.

In order to best tailor the protection device to the running conditions and the various types of obstacle, it is advantageous for the parts of each raised element of the protection device to have geometries that increase the friction forces in the separation zone.

One way of tailoring the friction-slip forces is to form on the facing walls that form the separation zone a geometry that comprises undulations or zigzags or any other relief Another way of increasing the friction-slip forces is to form a suitable roughness on the facing walls of the parts of each raised element, these walls delimiting the separation zone.

For preference, the separation surface separating two parts of a raised element of the protection device extends over a height at least equal to 50% of the height of each part of raised element.

More preferably still, this height is at least equal to 80% of the height of each part of raised element.

For a tire intended for a heavy duty vehicle with a seat diameter equal to 20 inches, it has been found that the dimensions of the raised elements of the protection device were preferably as follows:

the overall (which means to say including the extensions at each end) mean circumferential length L of each raised element is at least equal to 20 mm and at most equal to 150 mm, the height H is at least equal to 2 mm and at most 7 mm (this height is more preferably still less than 10 mm), the thickness E is at least equal to 0.5 times the height H and at most 3 times the same height.

BRIEF DESCRIPTION OF THE FIGURES

FIG. 1 depicts a perspective view of part of a tire comprising a sidewall protection device according to a first alternative form of the disclosure;

FIG. 2 depicts a view in section on II-II of a raised element of the device shown in FIG. 1;

FIG. 3 shows a view in section of the raised element shown in FIG. 2 and subjected to the action of an obstacle during running;

DETAILED DESCRIPTION OF THE ENABLING EMBODIMENT

Figure 4:
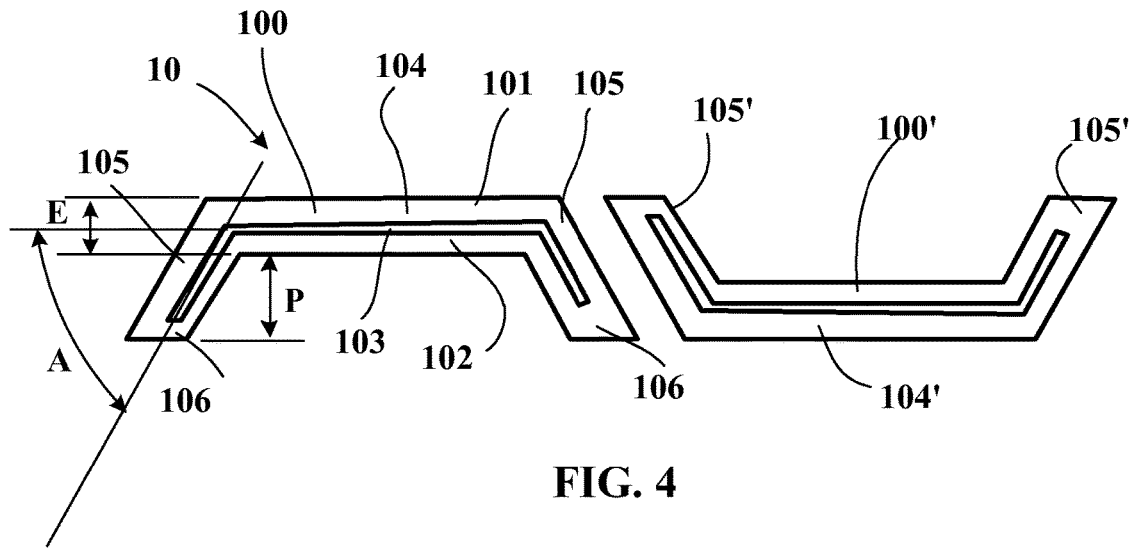
FIG. 4 shows a sidewall protection device according to a second alternative form of the disclosure.

To make the figures easier to read, the same reference signs have been used for describing alternative forms of the disclosure where these reference signs refer to elements that are the same in nature whether structurally or indeed functionally.

FIG. 1 depicts a perspective view of part of a tire 1 comprising a sidewall protection device according to a first alternative form of the disclosure. The tire 1 shown comprises a crown part 20 extended on each side by sidewalls 30, these sidewalls 30 connecting to beads 40 intended to come into contact with a tire mounting rim (not depicted here).

The tire 1 is reinforced by a carcass reinforcement 31 made up of a plurality of reinforcers. In this instance, these reinforcers are anchored in each bead 40 on bead wires 41 and extend from bead to bead passing through the sidewalls and the crown part 20.

In the case described, only the sidewall 30 intended to be positioned such that it is visible from the outside of the vehicle on which the tire is mounted is provided with a protection device 10 for protecting the said sidewall. Of course, this disclosure can be implemented on the two sidewalls of one and the same tire.

The crown part 20 comprises radially on the outside of the carcass reinforcement 30 a crown reinforcement 22 and radially on the outside a tread 21 of which a surface is intended to act as a tread surface 200.

Discernible on the sidewall 30 is a protection device 10 protecting against external attack that may be generated by obstacles against which the external sidewall of the tire comes into contact during running.

This device 10 is made of plurality of raised elements 100 secured to the sidewall 30, these raised elements 100 being arranged next to one another in the circumferential direction (identified in FIG. 1 by the arrow C) in a single line. The circumferential distance there is between each element is small so as to prevent any obstacle from directly attacking the sidewall. The raised elements of the protection device are located between an axial end of the crown part and the axially outermost points of the sidewall when the tire is mounted on its mounting rim and inflated to its working pressure. This arrangement in a single circumferential line could of course be supplemented by another circumferential line comprising patterns of the same type.

Each raised element 100 comprises an intermediate region 104 that is elongate in shape in the circumferential direction. This intermediate region 104 comprises two ends and is extended, at each of its two ends, by an extension 105 making a non-zero mean angle with the elongate intermediate region 104 of the raised element 100, and in this instance this angle is substantially equal to 45°.

Furthermore, each raised element 100 is formed by at least two facing parts 101, 102, these facing parts being at least partially disjointed from one another along a separation zone 103 of mean width equal to 1 mm in the scenario depicted. This separation zone is oriented substantially in the circumferential direction in the intermediate region 104 and extends over the entire length of each extension 105. Furthermore, each facing part 102, 103 is able to come into contact with the other part of the same raised element so as to at least partially close up the separation zone 103 that exists between the said two facing parts so as to generate friction by slippage of one part on the other when one of the said parts comes into contact with an external obstacle with a view to reducing the risks of tears in the sidewall.

The benefit of extending the intermediate region using extensions at an angle with respect to this intermediate region is that it improves the effectiveness of the device when the line of action of the force exerted by an obstacle is not in a strictly radial direction.

According to an advantageous alternative form, each extension of a raised element of the device makes an angle at least equal to 40° with the circumferential direction.

FIG. 2 depicts a view in section on II-II of the raised element 100 shown in FIG. 1. This cross section shows the two parts 101, 102 of the same raised element 100 in an unloaded state. This raised element has a height H equal 5 mm and an overall circumferential length L equal to 100 mm and a mean thickness E equal to 10 mm.

FIG. 3 shows a view in section of the raised element as depicted in FIG. 2 when this element comes into contact with an obstacle. The action of this obstacle is depicted schematically by an arrow F in FIG. 3. The obstacle applies stress which has the particular feature of being variable in intensity and direction because the tire is rotating when the contact occurs. Under this stress loading a first part 101 of the raised element 100 of the device 10 flexes and comes into contact with a second part 102 and thus partially closes the separation zone 103 between these facing parts in a first instance and then this second part 102 is likewise made to flex. Finally, slippage occurs in the zone of contact between the first part and the second part, this slippage being modulated by the friction forces developing there.

By virtue of this mechanism it has been found that is possible to limit the deformations of the carcass reinforcement in the sidewall upon contact with an obstacle during running, the protection device according to the disclosure absorbing a large proportion of the force of contact with the obstacle and redistributing this contact force in a way that is less penalizing to the carcass reinforcement.

The first alternative form described in FIGS. 1 to 3 comprises two facing parts per element of the protection device, these parts being intended to come into contact with one another upon contact with an external body. Of course, it is entirely possible to form more parts for one and the same element, these parts being intended to come into contact with one another.

In an alternative form that has not been depicted, the separation zone of the facing parts which are intended to collaborate by friction contact are provided with means of reducing the relative movements of one part with respect to the other. These means may consist of a zigzag shape or of a shape comprising undulations.

FIG. 4 shows a sidewall protection device according to a second alternative form of the disclosure. In this alternative form, the sidewall protection device 10 is formed by a succession in the circumferential direction of raised elements 100, 100' all having the same geometric characteristics. Each element 100 comprises an intermediate region 104 of elongate shape in the circumferential direction. This intermediate region 104 comprises two ends and is extended at each of its two ends by an extension 105 forming a non-zero mean angle A with the elongate intermediate region 104 of the raised element 100, and in this particular case this angle is substantially equal to 45°.

Furthermore each raised element 100 is formed of at least two facing parts 101, 102, these facing parts being at least partially disjointed from one another along a separation zone 103 of mean width equal 1 mm in the scenario depicted. This separation zone is oriented substantially in the circumferential direction in the intermediate region 104 and extends over just part of the length of each extension 105 so as to leave bridges of material 106 in place between the facing parts 101, 102. Each facing part 101, 102 is able to come into contact with the other part of the same raised element so as to at least partially close the separation zone 103 so as to generate friction by slippage of one part over the other when one of the said parts comes into contact with an external obstacle, with a view to reducing the risk of tears in the sidewall.

In this alternative form, the elements 100' are inverted with respect to the elements 100 and the distance separating the elements 100, 100' is suited to preventing any obstacle passing between the two elements.

Figure 5:
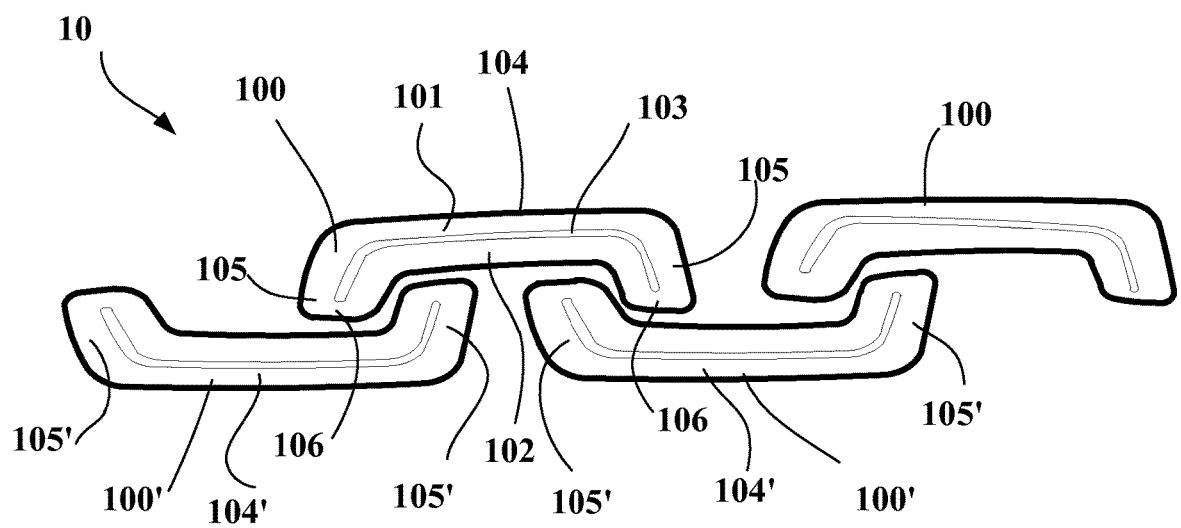
FIG. 5 shows a raised element of a device according to a third alternative form of the disclosure.

FIG. 5 shows a sidewall protection device 10 according to a third alternative form of the disclosure, this device comprising a plurality of raised elements 100 and 100' that can interact with one another. The description given for each element 100 is the same for the elements 100' except that the latter are in an inverted position with respect to the elements 100.

Each element 100 comprises an intermediate region 104 that is elongate in the circumferential direction, this intermediate region 104 having two ends each provided with an extension 105 each forming a mean angle equal to 45° with respect to the direction of the intermediate region 104. Each element 100' comprises an intermediate region 104' that is elongate in the circumferential direction, this intermediate region 104' having two ends each provided with an extension 105' each forming a mean angle equal to 45° with respect to the direction of the intermediate region 104'.

In this third alternative form, each raised element 100 (or 100') comprises two parts 101, 102 (or 101', 102') separated by a separation zone 103 (or 103') extending over the entire length of the intermediate region 104' and just partly into each extension 105'. In this alternative form, the raised elements 100 and the raised elements 100' are arranged in alternation and in such a way that an extension of an element 100' (or 100) is positioned between the extensions of an element 100 (or 100').

In this way, it is possible effectively to close the entire circumference of the tire. Furthermore, according to this alternative form, the elements can come into contact with one another when attacked by an obstacle.

The disclosure described here with a number of its alternative forms cannot of course be limited to these examples only, and various modifications, notably combinations between the examples described, can be made without departing from the scope defined by the claims.

What is claimed is:

1. A tire for a vehicle intended to carry heavy loads, this tire comprising:
   a carcass reinforcement having reinforcers,
   a crown part comprising a tread intended to be in contact with a roadway during running, this crown part comprising a crown reinforcement extended on each side by sidewalls, these sidewalls themselves being extended by beads intended to come into contact with a mounting rim,
   a protection device protecting at least one sidewall against external attack, this protection device comprising a plurality of raised elements formed on the sidewall that is to be protected, this plurality of raised elements of height H being arranged in the circumferential direction, each of the raised elements having a closed periphery which is entirely spaced radially inwardly of the tread, wherein each raised element comprises an intermediate region of elongate shape in the circumferential direction and this intermediate region comprising two ends and is extended, at each of its two ends, by an extension that makes a non-zero angle with the elongate intermediate region of the raised element and in that each element is formed by at least two facing parts, these parts being at least partially disjointed from one another along a separation zone, this separation zone being oriented substantially in the circumferential direction, and in that each part is able to come into contact with another part of the same raised element so as to at least partially close the separation zone that exists between the said two parts so as to generate friction by the sliding of one part against the other when one of the said parts comes into contact with an external obstacle, and wherein at least one raised element is present at every point along an entire circumference of said at least one sidewall of said tire.

2. The tire according to claim 1 wherein the mean angle of the extensions of the raised elements with the circumferential direction is at least equal to 40°.

3. The tire according to claim 1 wherein the parts of the raised elements of the protection device which are intended to come in contact with one another are connected to one another securely by the presence of a bridge of material.

4. The tire according to claim 1 wherein, with each raised element of the protection device having a height H and a circumferential length L, the separation zone separating two parts of one and the same raised element is at least equal to 50% of the surface area of each part, the latter being equal to the product of its height and its length measured in the circumferential direction.

5. The tire according to claim 4 wherein the separation zone has a geometry comprising undulations or zigzags.

6. The tire according to claim 1 wherein the parts of raised element of the protection device have geometries that increase the friction forces in the separation zone.

7. The tire according to claim 1 wherein the separation zone extends over a height at least equal to 50% of the height H of each part of raised element.

8. The tire according to claim 1 wherein the separation zone extends over a height at least equal to 80% of the height H of each part of raised element.

9. The tire according to claim 1 wherein the mean circumferential length L of each raised element is at least equal to 20 mm and at most equal to 150 mm, the height H is at least equal to 2 mm and at most 7 mm and the thickness E is at least equal to 0.5 times the height H and at most 3 times the same height, that being for a tire of a diameter equal to or exceeding 20 inches.

10. A tire for a vehicle intended to carry heavy loads, this tire comprising:
   a carcass reinforcement having reinforcers,
   a crown part comprising a tread intended to be in contact with a roadway during running, this crown part comprising a crown reinforcement extended on each side by sidewalls, these sidewalls themselves being extended by beads intended to come into contact with a mounting rim, and
a protection device protecting at least one sidewall against external attack, this protection device comprising a plurality of raised elements formed on the sidewall that is to be protected, this plurality of raised elements of height H being arranged in the circumferential direction, each of the raised elements having a closed periphery which is entirely spaced radially inwardly of the tread, wherein each raised element comprises an intermediate region of elongate shape in the circumferential direction and this intermediate region comprising two ends and is extended, at each of its two ends, by an extension that makes a non-zero angle with the elongate intermediate region of the raised element and in that each element is formed by at least two facing parts, these parts being at least partially disjointed from one another along a separation zone, this separation zone being oriented substantially in the circumferential direction, and in that each part is able to come into contact with another part of the same raised element so as to at least partially close the separation zone that exists between the said two parts so as to generate friction by the sliding of one part against the other when one of the said parts comes into contact with an external obstacle, wherein, with each raised element of the protection device having a height H and a circumferential length L, the separation zone separating two parts of one and the same raised element is at least equal to 50% of the surface area of each part, the latter being equal to the product of its height and its length measured in the circumferential direction, wherein the separation zone has a geometry comprising undulations or zigzags, and wherein the parts of raised element of the protection device are provided with a roughness able to increase the friction forces in the separation zone.

11. The tire according to claim 10 wherein the mean angle of the extensions of the raised elements with the circumferential direction is at least equal to 40°.

12. The tire according to claim 10 wherein the parts of the raised elements of the protection device which are intended to come in contact with one another are connected to one another securely by the presence of a bridge of material.

13. The tire according to claim 10 wherein the parts of raised element of the protection device have geometries that increase the friction forces in the separation zone.

14. The tire according to claim 10 wherein the separation zone extends over a height at least equal to 50% of the height H of each part of raised element.

15. The tire according to claim 10 wherein the separation zone extends over a height at least equal to 80% of the height H of each part of raised element.

16. The tire according to claim 10 wherein the mean circumferential length L of each raised element is at least equal to 20 mm and at most equal to 150 mm, the height H is at least equal to 2 mm and at most 7 mm and the thickness E is at least equal to 0.5 times the height H and at most 3 times the same height, that being for a tire of a diameter equal to or exceeding 20 inches.

* * * * *